United States Patent
Starr et al.

(10) Patent No.: US 8,255,705 B2
(45) Date of Patent: Aug. 28, 2012

(54) ENCRYPTION MONIKER IN MEDIUM AUXILIARY MEMORY

(75) Inventors: Matthew Thomas Starr, Lafayette, CO (US); Jeff Robert Boyton, Fort Collins, CO (US); Michael Gerard Goberis, Broomfield, CO (US); Nathan Christopher Thompson, Boulder, CO (US)

(73) Assignee: Spectra Logic Corp., Boulder, CO (US)

( * ) Notice: Subject to any disclaimer, the term of this patent is extended or adjusted under 35 U.S.C. 154(b) by 1289 days.

(21) Appl. No.: 11/933,393

(22) Filed: Oct. 31, 2007

(65) Prior Publication Data

US 2010/0031054 A1     Feb. 4, 2010

Related U.S. Application Data

(63) Continuation-in-part of application No. 11/412,565, filed on Apr. 27, 2006, now Pat. No. 7,681,048.

(51) Int. Cl.
    *G06F 12/14*     (2006.01)
    *G06F 13/00*     (2006.01)
    *H04L 9/00*     (2006.01)

(52) U.S. Cl. ......... 713/193; 713/189; 380/277; 711/111

(58) Field of Classification Search ............... 713/193, 713/189; 380/277
See application file for complete search history.

(56) References Cited

U.S. PATENT DOCUMENTS

| | | | |
|---|---|---|---|
| 5,592,550 A | * | 1/1997 | Davis et al. .................. 360/69 |
| 5,900,888 A | * | 5/1999 | Kurosawa ..................... 347/7 |
| 6,425,042 B1 | | 7/2002 | Ikeda et al. |
| 7,421,691 B1 | * | 9/2008 | Hancock et al. .............. 718/100 |
| 2004/0105187 A1 | | 6/2004 | Woodruff et al. |
| 2004/0223253 A1 | | 11/2004 | Woodruff et al. |
| 2004/0264037 A1 | | 12/2004 | Downey et al. |
| 2004/0264038 A1 | | 12/2004 | Heineman et al. |
| 2004/0264039 A1 | | 12/2004 | Armagost et al. |
| 2004/0264040 A1 | | 12/2004 | Armagost et al. |
| 2004/0264041 A1 | | 12/2004 | Kumpon et al. |

(Continued)

FOREIGN PATENT DOCUMENTS

JP     10-161781     * 11/1996

OTHER PUBLICATIONS

Matt Starr. Encryption: secure encrypted backups by careful key management; Second article in a series on encrypting backed up data stored to tape or other mobile media. Jan.-Feb. 2006. Computer Technology Review. Copyright 2006. West World Productions Inc. pp. 1-3.*

(Continued)

*Primary Examiner* — Kambiz Zand
*Assistant Examiner* — Aubrey Wyszynski
(74) *Attorney, Agent, or Firm* — Kenneth Altshuler

(57) ABSTRACT

A tape cartridge is described including tape storage medium maintaining stored encrypted data that can be unencrypted via an encryption key. The tape cartridge also contains a medium auxiliary memory possessing a moniker wherein the moniker identifies the encryption key. The tape cartridge further includes a threshold parameter stored in the medium auxiliary memory wherein the threshold parameter influences a moniker state control, the moniker state control comprises an on state and an off state wherein the off state disables the moniker from identifying the encryption key.

21 Claims, 12 Drawing Sheets

U.S. PATENT DOCUMENTS

| | | |
|---|---|---|
| 2004/0264042 A1 | 12/2004 | Pollard et al. |
| 2005/0007692 A1 | 1/2005 | Thompson et al. |
| 2005/0052772 A1 | 3/2005 | Barbian et al. |
| 2005/0152670 A1* | 7/2005 | Skaar .............. 386/46 |
| 2006/0034625 A1* | 2/2006 | Kajikawa ........... 399/12 |
| 2006/0039248 A1 | 2/2006 | Sasaki |
| 2006/0080545 A1* | 4/2006 | Bagley ............. 713/183 |
| 2006/0164928 A1 | 7/2006 | Starr et al. |
| 2007/0050834 A1 | 3/2007 | Royo et al. |
| 2007/0195447 A1 | 8/2007 | Starr et al. |
| 2009/0109565 A1* | 4/2009 | Thompson et al. ...... 360/69 |

OTHER PUBLICATIONS

U.S. Appl. No. 11/412,565, filed Apr. 27, 2006, Starr et al.

The seventh edition of the *IBM Total Storage LTO Ultrium Tape Drive SCSI Reference* (Jun. 2007).

The first edition of the *IBM Setup, Operation, and Service Guide to IBM Total Storage 3580 Tape Drive Model L33/L3H, Reference* (Dec. 2004).

* cited by examiner

ENCRYPTION MONIKER IN MEDIUM AUXILIARY MEMORY

CROSS-REFERENCE TO RELATED APPLICATIONS

This application is a continuation in part of U.S. Ser. No. 11/412,565, filed Apr. 27, 2006, the entire disclosure of which is incorporated herein by reference.

BACKGROUND OF THE INVENTION

1. Field of the Invention

The present invention relates generally to tape cartridges containing medium auxiliary memory devices wherein at least a moniker related to an encryption key can be maintained.

2. Description of Related Art

The data storage industry is experiencing a boom fueled in part by aggressive cost reduction of data storage due to advances in storage technology, broadened international accessibility to the internet and the World Wide Web and the public's appetite to accumulate data. Unfortunately, with the boom has come associated undesirable activities, such as data attacks and data theft. Data stored in data storage libraries are among the primary targets of such attacks and theft.

Data storage libraries serve as data receptacles for a variety of clients including businesses, governments and the general population. These libraries are generally comprised of tape drives adapted to read and write user data to and from tape cartridges which can be archived within outside of the libraries. FIG. 1A shows an example of a contemporary tape cartridge 150 currently being used in many of the mainstream storage libraries. As illustratively shown, the tape cartridge 150 generally comprises tape medium 152 and in some cases, a Medium Auxiliary Memory (MAM) 154, shown here in dashed lines because the MAM 154 and tape medium 152 reside in the interior of the cartridge 150. The MAM 154, as shown in FIG. 1B, fundamentally comprises an integrated circuit that includes solid state memory and a transponder 166 attached to an antenna 168, the antenna is typically a small coil of wires. The MAM 154 is considered a passive device because it is energized when subjected to a strong enough RF field produced by a MAM-reader. Information, such as tape cartridge serial number and load count, can be transmitted between the MAM 154 and the MAM-reader via a specific radio frequency. MAMs 154 can cut data access time down to a fraction from historical techniques which require reading key parameter information directly from the tape medium 152. One advantage of a tape cartridge 150 is mobility providing archive ability in remote locations called "vaults" making an "on-line" data attack difficult, if not impossible. However, should an attacker acquire a tape cartridge, the data stored on the tape medium 152 or the associated MAM 154 may be subject to unwanted access. In attempts to prevent unwanted access, a tape cartridge, or other mobile media capable of being used in a data storage library, can be armed with a number of security measures including data encryption. One fundamental component of data encryption is knowledge of how to decode or decrypt the data; such knowledge is known to those skilled in the art as the key. Therefore, it is of the utmost importance to prevent the key from falling into the hands of someone attempting to access the encrypted data without authorization.

In an effort to improve managing encrypted data on mobile media (within a library or vault, for example) while using full capability of a tape cartridge, such as the cartridge 150, both methods and apparatus are disclosed herein. It is to innovations related to this subject matter that the claimed invention is generally directed.

SUMMARY OF THE INVENTION

The present invention generally relates to medium auxiliary memory device containing a moniker associated with a remotely located encryption key that overcomes the disadvantages and limitations of the prior art by using a medium auxiliary memory reader device to obtain knowledge of the moniker from which the encryption key can be found to decrypt encrypted user data stored in a tape cartridge.

One embodiment of the present invention can therefore comprise a tape cartridge comprising: tape storage medium; encrypted data stored on the tape storage medium wherein the encrypted data can be unencrypted via an encryption key; an auxiliary memory device possessing a moniker wherein the moniker identifies the encryption key.

Another embodiment of the present invention can therefore comprise a tape storage library comprising: a tape drive; an auxiliary memory data transfer device; and a tape cartridge comprising a tape medium that possesses encrypted data wherein the encrypted data can be unencrypted via an encryption key, the tape cartridge further comprising an auxiliary memory device that contains a moniker and a threshold parameter wherein the moniker identifies the encryption key and wherein the threshold parameter influences a means for disabling the moniker from identifying the encryption key.

Yet another embodiment of the present invention can therefore comprise a method comprising: providing a library with at least one tape drive, an auxiliary memory data transfer device, and a tape cartridge, the tape cartridge possessing a tape storage medium and a auxiliary memory device; loading the tape cartridge in the at least one tape drive; storing encrypted user data on the at least one tape storage medium; recording a moniker associated with an encryption key to the auxiliary memory device; writing a threshold parameter with a threshold limit to the auxiliary memory device.

DETAILED DESCRIPTION

Figure 2A:
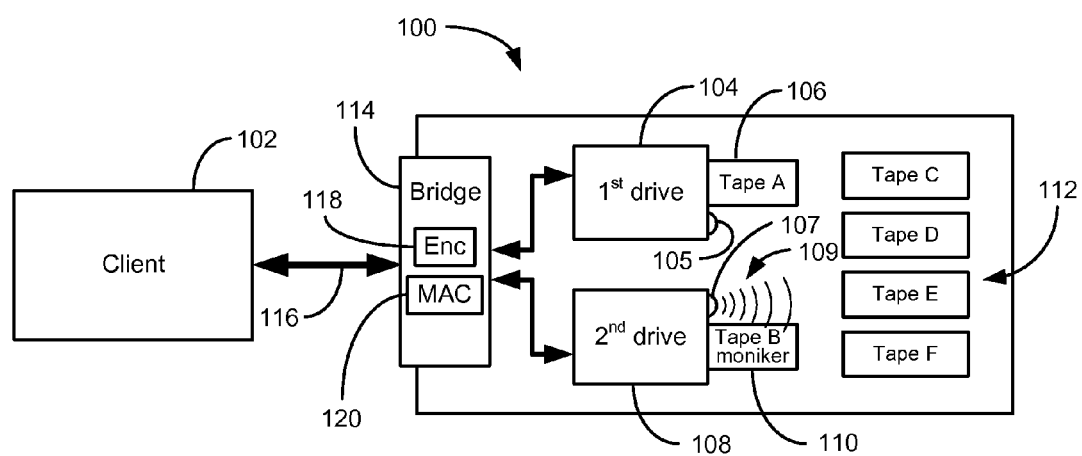
FIG. 2A is a block diagram of a data storage arrangement constructed in accordance with an embodiment of the present invention.

Referring to the drawings in general, and more specifically to FIG. 2A, shown therein is a block diagram of a data storage arrangement constructed in accordance with an embodiment of the present invention. In what follows, similar or identical structure may be identified using identical callouts.

The data storage arrangement illustrated in FIG. 2A can comprise a client 102 in communication 116 with a data storage library 100. The client 102 can be a host computer or some other consumer, producer or user of data; other embodiments can also include another storage library or a streaming output device, such as a video server, to name several examples. The client 102 is an entity, or entities, that is capable of "taking in" data, for example a client 102 is a consumer when receiving data and a storage library 100 is a consumer when receiving data. As one skilled in the art will appreciate, in addition to "taking in" data, a consumer of data is also generally capable of manipulating and/or transmitting data. The client 102 can be a personal computer, a main frame computer, a server, or any computer system operatively linked to the storage library 100, to name a few examples. The communication path 116, at a minimum, needs only to facilitate communication between the client 102 and the storage library 100. The means for communication can be accomplished by a dedicated pathway (such as a SCSI [Small Computer Systems Interface] cabled connection), fibre-channel or, in an alternative embodiment, a pathway over a network (such as a LAN, WAN, or other communication architecture), for example. Furthermore, the communication path can be in the form of a wire line pathway, wireless, or a combination thereof.

The library 100 illustratively comprises a combination bridge controller device 114 capable of making compatible communication traffic between at least a first or second tape drive 104 and 108 and the client 102. In an alternative embodiment, the drives 104 and 108 may include a non-tape drive adapted to cooperate with a non-tape medium, such as a flash memory or disc drive magazine comprising an auxiliary memory device 154, for example. In one example, the client 102 may be in communication 116 with the library 100 via fibre-channel using a fibre-channel protocol; however, the tape drives 104 and 108 comprised by the library 100 may be configured to communicate with the client 102 via SCSI-channel using a SCSI protocol. The combination bridge controller device 114 bridges (makes compatible) the communication differences between the client 102 and the components within the library 100, such as the first drive 104. The combination bridge controller 114 is further adapted to direct storage related communications, i.e. a data package, to either the first tape drive 104 that is cooperatively linked with tape cartridge 'A' 106 and/or the second tape drive 108 that is cooperatively linked with tape cartridge 'B' 110. A data package is considered a discrete article of data, such as for example a file, a group of data received in a substantially contiguous time interval, data that is linked (i.e. a folder), or data that is of a predetermined size, to name several examples. The library 100 also comprises a plurality of tape cartridges (tapes C-F) 112 capable of storing user data, which can be disposed in a shelf system (not shown). As one skilled in the art will recognize, a tape cartridge, such as one of the tape cartridges 112, can be moved within or outside of the library 100 and can be used with other compatible tape drive devices.

The combination bridge controller device 114 can comprise an encryption engine 118 capable of encrypting at least one data package received over communication path 116 by the client 102. Embodiments of the encryption engine 118 can include software programs used with a processor, or alternatively, an integrated circuit chip comprising encryption capability, to name two non-limiting examples. The encryption engine 118 need only be capable of altering data from plain text, or in some cases data "as received" from the client 102, to a form requiring a key to decipher, or bring back the data to the "as received" state. An "as received" state could be in a form other than plain text, such as a data package previously encrypted or compressed by the client 102 for example.

Figure 1A:
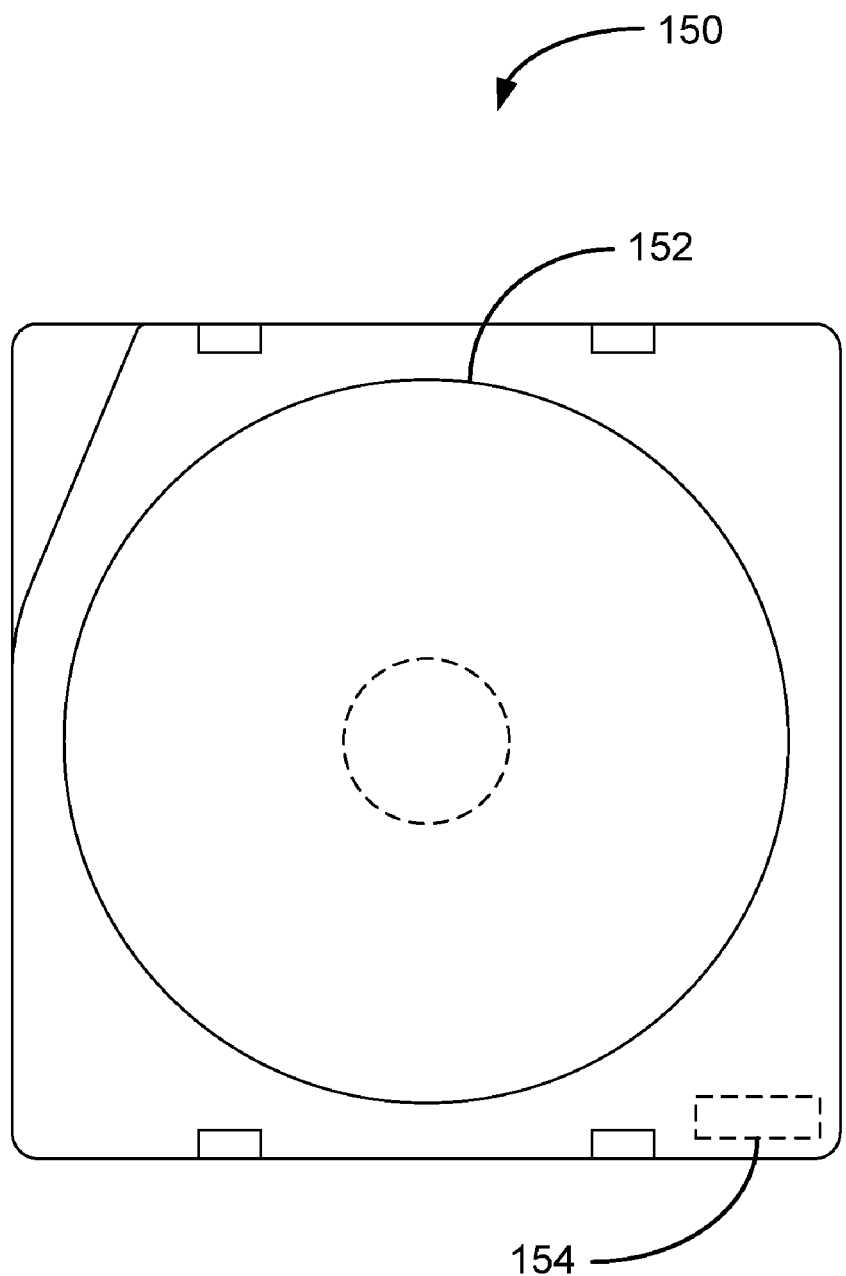
FIG. 1A is a prior art pictorial representation of a tape cartridge with an auxiliary radio frequency memory device.
Figure 1B:
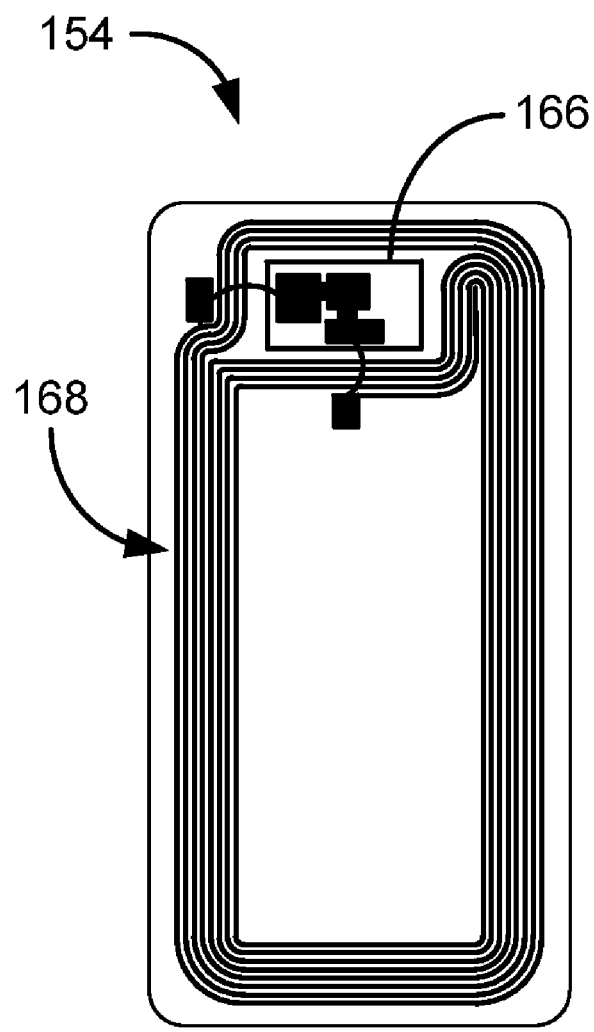
FIG. 1B is a prior art pictorial representation of an auxiliary radio frequency memory device.

In addition to the encrypted data, the combination bridge controller device 114 is also capable of generating a moniker, or nickname, associated with the key and a Message Authentication Code (MAC) generated by a MAC engine 120. The moniker need not be generated by the combination bridge controller device 114, but can optionally be defined by a client 102 or an operator, for example. Once created, the moniker can be transmitted to a Medium Auxiliary Memory (MAM) associated with a tape cartridge, such as the tape cartridge 150 and MAM 154, as shown in FIG. 1A. The tape cartridge 150 and MAM 154 will be used herein generically to describe any tape cartridge containing a MAM unless otherwise specified. In one embodiment of the present invention, the moniker can optionally be encrypted.

In one embodiment consistent with the present invention, the MAM 154 can include a threshold parameter that influences a moniker state control. The moniker state control is one means for which a threshold parameter can influence disabling the moniker. The threshold parameter can invoke a program that scrambles the MAM or a program that encrypts the moniker, or an algorithm to delete the moniker, just to name several examples of a means for disabling a moniker from identifying an encryption key. With reference to the state control, a state control can be as simple as a bit of data that can be toggled between two states corresponding to an on state and an off state (or a first state and a second state), for example. The on state can be associated with an ability to use the moniker to decrypt the user data stored on the tape cartridge 150. The off state can be associated with a state wherein the moniker is disabled causing the encrypted data unable to be decrypted. The off state, therefore, causes a forced key expiration because without a moniker, the associated key cannot be found. An algorithm located in the MAM 154, library 100, or elsewhere, having knowledge of the specified threshold parameter and associated specified limit can be used to compare the specified limit of the specified threshold parameter with an associated input, such that when an input relating to the specified threshold parameter reaches the specified limit, the moniker is disabled. The input can be updated every time a tape cartridge 150 is loaded in a tape drive. A MAM reader and writer device, such as the MAM reader 107, may be used to energize the MAM 154 thus activating and running a routine that is used to disable the moniker given a threshold parameter is met.

In one embodiment of the present invention, the off state is irreversible wherein the data is permanently lost. Alternatively, the off state may be reversed by a custodian of the original encrypted data, such as by a host, OEM, or some other entity with the authority to reverse the state, for example. One embodiment of a threshold parameter is a time limit wherein after a specified amount of time after following the storage and encryption of user data, the moniker will set to expire, for example. Another example of a time limit is that all encrypted data from a specific client 102 may be set to expire on a specified date. Other embodiments of a threshold parameter include moving a tape cartridge to an unauthorized location, a maximum number of times a tape cartridge 150 is loaded into a tape drive, a specific number of incorrect access attempts, a number of different libraries with which the tape cartridge is used, just to name a few examples.

With continued reference to FIG. 2A, as illustratively shown, tape cartridge 'B' 110 is inserted in the second tape drive 108 and a MAM reader and writer device 107, associated with the second tape drive 108, is shown transmitting at least a moniker to tape cartridge 'B' 110 via a Radio Frequency (RF) field 109. As shown, tape cartridge 'A' 106 is inserted in the first tape drive 104 and tape cartridge 'B' 110 is inserted into the second tape drive 108. A tape cartridge, such as tape cartridge 'B' 110, can be inserted into a tape drive, such as the second tape drive 108, and receive information via a MAM reader, such as 107, prior to threading the tape medium, such as the medium 152 of FIG. 1A, associated with the tape cartridge. Once the tape medium 152 is threaded in the tape drive, the tape cartridge 110 is placed in a condition for reading and writing user data to the medium 152. Once threaded, the tape cartridge is considered loaded in the tape drive. The MAC provides a way to check the integrity of information transmitted over or stored in an unreliable medium (i.e. mobile medium that is subject to tampering or simple data degradation due to adverse environmental conditions effecting data retention, to name a couple examples). A MAC is an authentication tag (such as a checksum) derived by applying an authentication scheme together with a secret encryption key for example. Unlike digital signatures, MACs are computed and verified with the secret encryption key, typically to be verified by an intended recipient associated with the secret encryption key. Different types of MACs include: unconditionally secure based MACs, hash function-based MACs (HMACs), stream cipher-based MACs and block cipher-based MACs, to name four options. The MAC and moniker, in one embodiment, are stored in a MAM 154 associated with a tape cartridge 150. Upon decryption of the stored encrypted data, the moniker can be used to identify the encryption key, or simply the key, enabling the encryption engine 118 to decrypt the encrypted data package. In one embodiment, the moniker can be a plain text name associated with the key, for example the moniker 'SALLY' is the code name associated with the key '1ks39J0$A' wherein 'SALLY' is stored on the media and cannot intrinsically decrypt the encrypted data, only the key can decrypt the encrypted data. In one embodiment, the library 100 may be the only entity that has knowledge of both the key and moniker, hence a library, or tape drive, different from the library 100 that stored the encrypted user data on the tape cartridge 150 will fail in attempts to decrypt the tape cartridge 150 unless it too has or obtains knowledge of the moniker and associated key. In an alternative embodiment, the moniker and key are uniquely known by the client 102 and attempts from another source to decrypt the encrypted data will fail. In yet another alternative embodiment, knowledge of the key and moniker may be in two or more locations, such as the client 102 and the library 100, for redundancy to ensure against the loss of the key in one of the locations for example. The MAC can be used to guarantee that the decrypted data package has been unaltered from the data package prior to encryption upon processing the MAC through the MAC engine 120. Authenticating that the decrypted data package is complete and without change demonstrates that the decryption process was successfully accomplished and the user data was not altered in any way. In other embodiments, the RF field 109 generated by the second drive 108 is shown transmitting a MAC, a threshold parameter and state control bit.

Figure 2B:
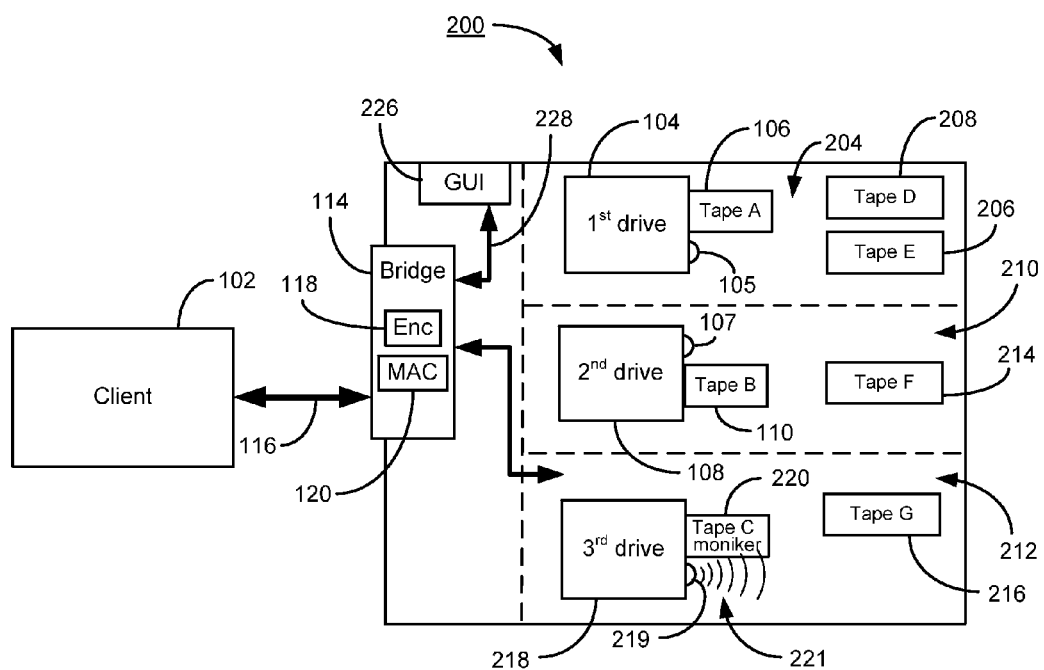
FIG. 2B shows an alternative embodiment of the present invention showing a combination bridge controller device directing storage traffic to a specific partition.

FIG. 2B shows an alternative embodiment of the present invention wherein the combination bridge controller device 114 is capable of directing storage traffic to a specific partition. As illustratively shown, the library 200 comprises a first, second and third partition 204, 210 and 212 respectively. Each partition can be allocated library 200 resources and storage capacity for a specific client, such as client 102, for example. The first partition 204 comprises three tape cartridges 'A', 'D' and 'E' 106, 208 and 206 respectively, the second partition 210 comprises two tape cartridges 'B' and 'F' 110 and 214 respectively, and the third partition 212 comprises two tape cartridges 'C' and 'G' 220 and 216 respectively. In one embodiment, the three partitions 204, 210 and 212 can be of equal size; that is, having identical storage capacities.

In another alternative embodiment, the three partitions 204, 210 and 212 can be combined to comprise the total storage capacity and resources of the library 200. The partitions 204, 210 and 212 can be dedicated to the same client, such as client 102, to different clients or a combination thereof. As one skilled in the art will appreciate, a library, such as the library 200, can be configured with numerous partitioning layouts and schemes. A partition, such as the first partition 204, may be configured by the client 102 or by an operator sending commands through a graphical user interface 226, to name two optional set-ups. As shown, the client 102 is in communication 116 with the combination bridge controller device 114 to store or retrieve data in the third partition 212. In this example, an operator can input a moniker associated with a key by means of the graphical user interface 226. In one configuration, the graphical user interface 226 can be linked with the combination bridge controller device 114 via a CAN (Component Area Network) 228. Both knowledge of the moniker and key can be stored in the library 200, and in one embodiment, stored in a memory device associated with the graphical user interface 226. In yet another embodiment, knowledge of the moniker and or the key can reside in the CAN. Optionally, the client 102 can have knowledge of the moniker and key and, thus, provide the library 200 the moniker and key upon a request to retrieve the encrypted user data maintained by the tape cartridge, in this case, tape cartridge 'C' 120. As similarly described in FIG. 2A, a data package received over communication path 116 from the client 102 can be encrypted by the encryption engine 118 and stored along with a moniker, and optionally a MAC and/or a threshold parameter and state control, on the MAM 154 associated with tape cartridge 'C' 220 via the RF signal 221 emitted by the MAM reader and writer device 219. In an optional embodiment, the MAC and moniker can be stored on the medium 152 associated with tape cartridge 'C' 220 in addition to the MAM 154 associated with tape cartridge 'C' 200. Such an embodiment can provide redundancy for accessing the MAC and moniker.

Figure 3A:
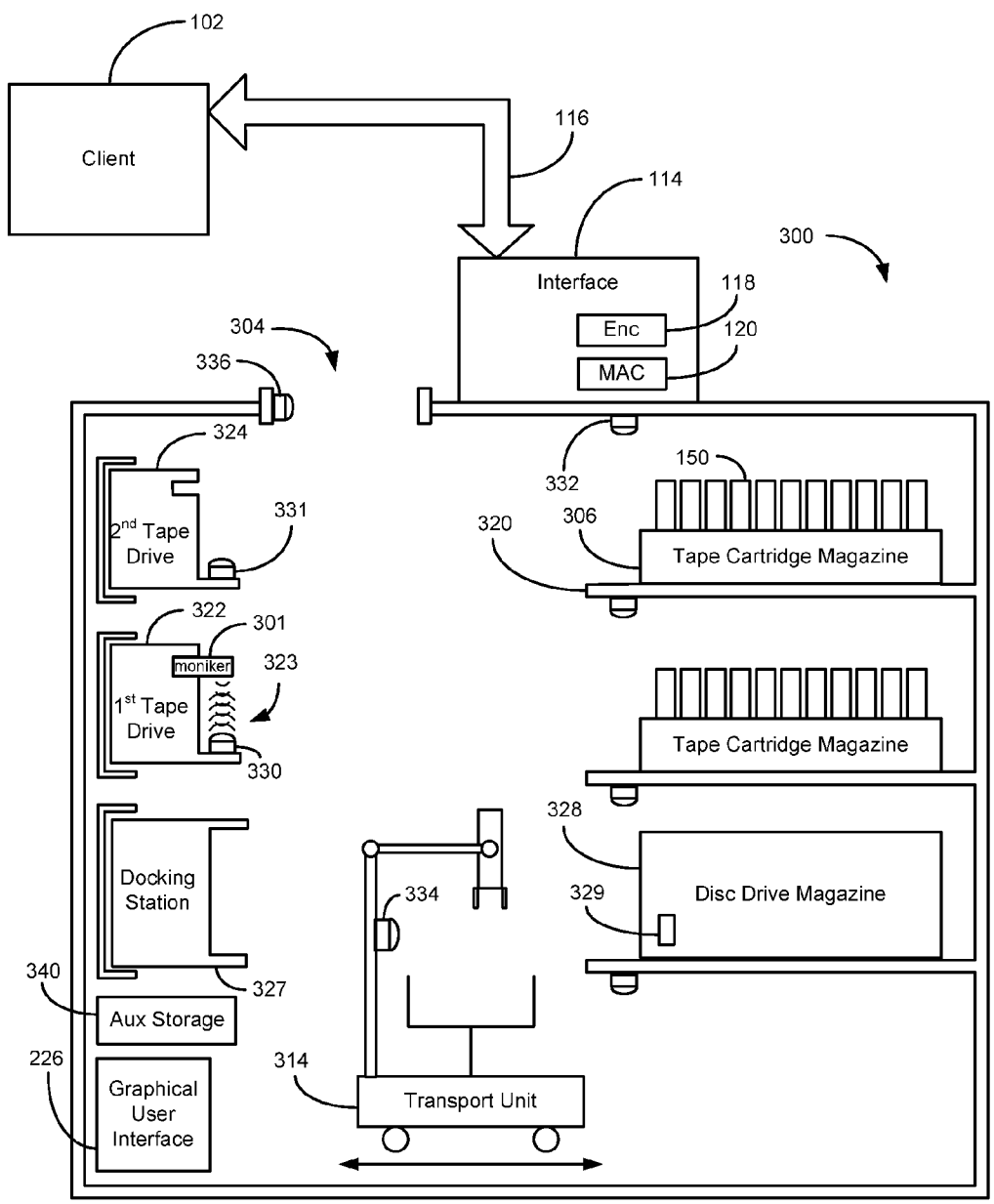
FIG. 3A is an illustration of a data storage arrangement constructed in accordance with an embodiment of the present invention.

FIG. 3A is an illustration of a library 300 arrangement constructed in accordance with embodiments of the present invention. As illustratively shown, the client 102 is in communication with the library 300 via the communication path 116 and the combination bridge controller device 114. The library 300 comprises two embodiments of a mobile storage medium, a disc dive magazine 328 and tape cartridge magazines 306 accommodating a plurality of tape cartridges 150. The disc drive magazine 328 provides random access data storage of user data when linked with a docking station 327 comprised by the library 300. In this embodiment, the library 300 also comprises a first tape drive 322 and a second tape drive 324, each capable of reading and writing data to and from one of the plurality of tape cartridges 150. Each tape drive 322 and 324 can be associated with a MAM reader and writer device 230 and 231, respectively. As shown here, tape cartridge 301 is inserted in the first tape drive 322. As illustratively shown, the first tape drive's MAM reader and writer device 330 is in RF communication 323 with the MAM 154 associated with tape cartridge 301. The library 300 can further comprise a shelving system 320 capable of archiving the tape cartridge magazines 306 and disc drive magazine 328 within the library 300. In this embodiment, the shelving system 320 is associated with one or more MAM reader devices 332 capable of reading data stored on a MAM 154 associated with a tape cartridge 150, a disc drive magazine MAM 329 or a tape cartridge magazine MAM 353, shown in FIG. 3B. A transport unit 314 comprises means for transporting a tape cartridge magazine 306 from the shelf system 320 to a location that facilitates the insertion of a tape cartridge 150 in one of the tape drives 322 or 324, such as tape cartridge 301 inserted in drive 322 and enabled to read and write user data. The transport unit 314 also comprises a means to transport the disc drive magazine 328 from the shelf system 320 to a location that facilitates linking the disc drive magazine 328 with the docking station 327. The transport device 314 can optionally be associated with at least one MAM reader device 334, as shown here, associated with the transport unit 314. The MAM reader device 334 is one example of a MAM reader device independent of a tape drive's MAM reader and writer device 330 and 331. The library 300 also optionally comprises an entry/exit port 304 through which tape cartridges 150, tape cartridge magazines 306 or disc drive magazines 328 can be transferred between an environment external to the library 300 and an environment internal to the library 300. As shown here, preferably at least one MAM reader device 336 is associated with the entry/exit port 304. The entry/exit MAM reader device 336 can provide knowledge of a storage element, such as a tape cartridge 150, for example, being removed or introduced to the library 300, whether authorized or unauthorized. Such knowledge can be used for inventory purposes or to notify the client 102 of a storage element passing by the entry/exit MAM reader device 336, just to name two examples. In another embodiment, a threshold parameter limiting a tape cartridge 150 to being used in a user specified location is stored on the MAM 154. A location limiting threshold parameter can alter the state of a state control should a tape cartridge 150 be moved in an unauthorized location. For example, if a tape cartridge 150 is passed by the entry/exit MAM reader device 336, the state control can be toggled to an off state, thus disabling the moniker. Optionally, the moniker may be restored if the tape cartridge 150 passes the entry/exit MAM reader device 336 on the way back into the library 300. Alternatively, another sensor may control the on/off state of the state control. In yet another alternative embodiment, an unknown tape drive or unknown MAM reader may activate the state control toggling to an off state. The location limiting threshold parameter is not limited to the embodiments used herein as illustrative examples.

As further shown in FIG. 3A, the library 300 can accommodate a graphical user interface 226 and an auxiliary memory device 340, such as a disc drive or solid state memory device, capable of retaining (storing) relevant information related to each tape cartridge 150, tape cartridge magazine 306 or disc drive magazine 328. The auxiliary memory device 340 and/or graphical user interface 226 are linked to each MAM reader device, such as the MAM reader 330, via a linking means, such as a cable or some other wireless device, through which a MAM reader device transmits at least some of the information retained on a MAM 154 from a tape cartridge 150, for example. In one embodiment, the auxiliary memory device 340 maintains information, such as MAC, moniker and/or key information, for specific partitions that relate specifically to the partition's tape cartridges 150, tape cartridge magazines 306 and/or disc drive magazines 328.

In an embodiment consistent with FIG. 3A, the disc drive magazine 328 and tape cartridge magazines 306 have substantially identical footprints to facilitate commonality for transporting within the data storage library 300 by the transport unit 314. An identifier, such as a bar code for example, can be associated with any disc drive magazine 328 or tape cartridge magazine 306 for identification if archived in a remote location for example, such as the archive vault for example. In another embodiment of the present invention, the docking station 327 is dimensionally substantially identical to a tape drive for interchangeability.

In one example consistent with embodiments of the present invention, user data received from the client 102 is encrypted by the encryption engine 118, a decryption key is generated, such as by a key generator which can be associated with the interface 114, for example, and a moniker is either generated by a moniker generating algorithm or is inputted by the client, just to name several examples. The graphical user interface 226 is optionally capable of transmitting the moniker associated with a key required to decrypt the encrypted data as inputted by an operator, for example. The key can be randomly generated from a pool of numbers, letters and symbols, for example, and the moniker can be assigned to the key by an operator, for example. In one exemplary scenario, tape cartridge 301 contains encrypted data stored on the medium 152 and a moniker and MAC associated with the encrypted data is stored and maintained on the associated MAM 154. The tape cartridge 301 is capable of being removed from the library 300 via the entry/exit port 304 and disposed in an archive location, such as a room remote from the library 300. In an embodiment wherein the library 300 is the only entity with knowledge of the decryption key and the moniker, the encrypted data cannot be readily decrypted without enlisting the library 300 for help. The moniker can enable the library 300 to quickly make a determination which key to use to decrypt. The key can be provided by the library 300 with knowledge of the moniker to, for example, a user or a second authorized library or device capable of reading data from the mobile medium. In yet another embodiment, the mobile medium can additionally have an identification means associating it with the specific library from which the data was stored. An example of an identification means can be library identification stored along with the moniker and MAC in a memory allocated space, a serial number, a barcode, the MAM 154 or some alternative identifying means.

Upon decrypting the encrypted data stored in the cartridge 301, the moniker is read from the MAM reader device 330, or an alternative MAM reader device independent from a tape drive, and is matched with the associated decryption key 422. Knowledge of the moniker and the decryption key can be in the combination bridge controller device 114, the auxiliary memory device 304, or a different memory device within the library 300, or an alternative location independent from the library 300, such as the client 102, or a combination of in and out of the library 300, for example. Once the data is decrypted, the MAC can be used to validate the authenticity and integrity of the decrypted data (validating that the data is the same when decrypted as it was prior to encryption). In this embodiment, the combination bridge controller device 114 is also capable of assembling the decrypted data back to the original contiguous form as received from the client 102 for transmission back to the client 102, for example.

A MAM 154, in one embodiment, is parceled into three regions in which data can be stored; a medium device region which contains information such as a serial number, a device region which contains information from the tape drive such as load count, and host/vendor unique region wherein information such as the moniker, MAC data and expiration date or other forced expiration means related to the encrypted data stored in the cartridge 154 can be stored. The information in the regions can be added to or changed with new information via an address related to the arrangement of available storage space in the MAM 154 or, optionally, the information can be read by a MAM reader, such as the MAM reader 330, and reassembled with additional information and stored on the MAM 154 as the reassembled version, just to name two examples. In another example, the information contained in the MAM 154 can be compressed with algorithms to decompress residing in the library 300 or client 102. Data, such as the load count, can be used in conjunction with a threshold parameter stored on the MAM 154 that maintains a moniker used in conjunction with a key to decrypt encrypted user data. A load count threshold can be set to a certain number, or quantity, of times a tape cartridge 150 is loaded in a tape drive, such as tape drive 322. If the load count exceeds the specified threshold of loads, then a corresponding state control can be switched from an on state to an off state resulting in disabling the moniker associated with the key to decrypt the encrypted data. In another threshold parameter embodiment, the MAM 154 can maintain the number of incorrect data access attempts wherein, for example, a wrong moniker is entered to verify decryption multiple times that exceeds the number of times specified. Once the threshold number of access attempts is reached, the state control can be toggled to an off state which disables the moniker and prevents the encrypted data from being decrypted. In yet another threshold parameter embodiment, the MAM 154 associated with a tape cartridge 150 may account for the different tape libraries or drives that have been used in conjunction with the tape cartridge 150. If the number of different drives or libraries exceeds a threshold limit than the state control can be switched to an off state thus disabling a moniker associated with encrypted data stored on the tape cartridge 150. The MAM 154 can further be informed which libraries and/or tape drives are authorized to cooperate with the associated tape cartridge 150. If an unauthorized tape or library attempts to access data encrypted on the tape cartridge 150, then a state control can be switched off thus disabling the ability to decrypt and read the user data. In an optional embodiment relative to the above embodiments, an authorized entity, such as a client or host, may possess the power to reverse the state control or override the state control if the moniker has been disabled.

Figure 3B:
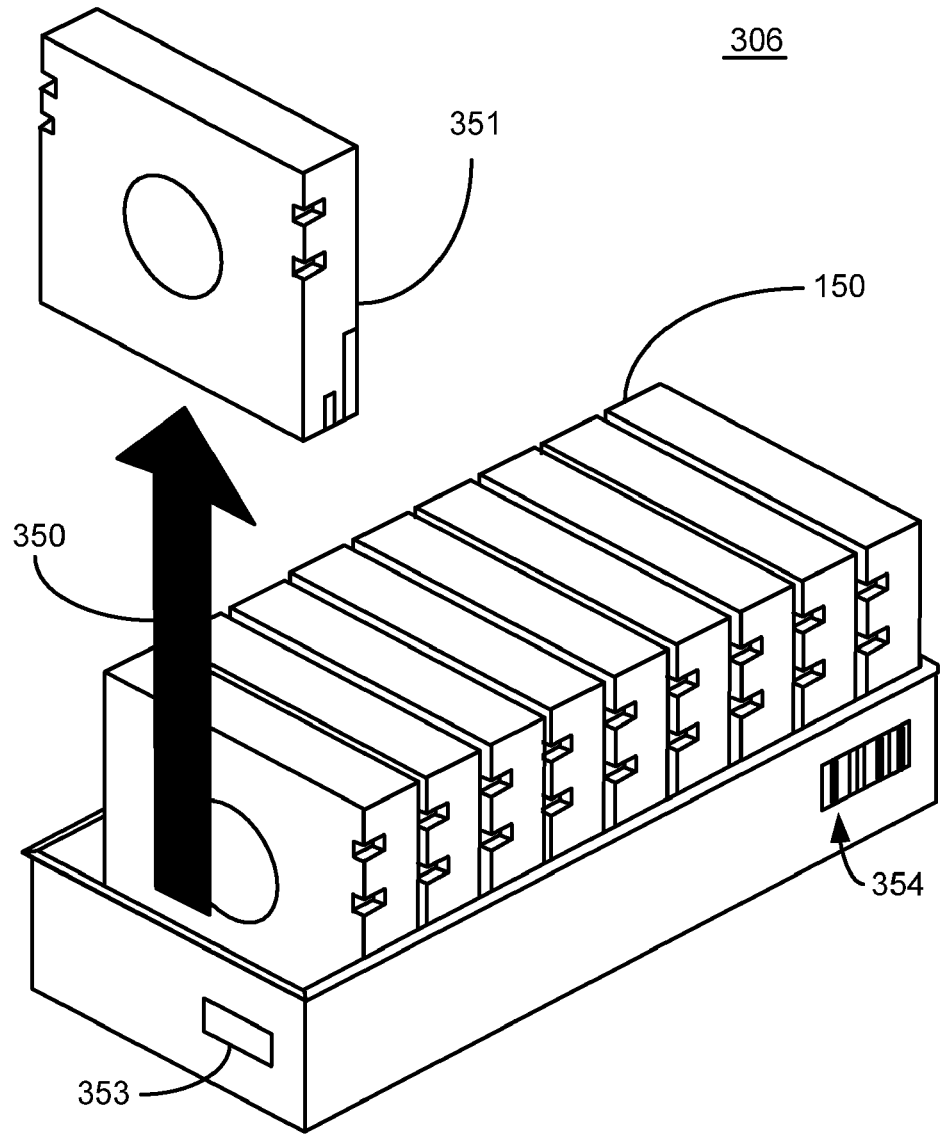
FIG. 3B is an illustration of a populated tape cartridge magazine in accordance with an embodiment of the present invention.

With reference to FIG. 3B, shown therein are a plurality of tape cartridges 150 supported by a tape cartridge magazine 306. In more detail, a tape cartridge 150 can be an LTO-3 category tape cartridge manufactured by IBM of Armonk, N.Y., which comprises magnetic tape medium that is capable of storing digital data written by a compatible tape drive, such as an LTO-3 tape drive manufactured by IBM. A tape cartridge, such as tape cartridge 351, can be removed from the tape cartridge magazine 306, as shown by the arrow 350, and inserted into a tape drive, such as the tape drive 322, by means of a picker device 502, shown in FIG. 5. Disposed on the tape cartridge magazine 306 is a bar code identifier 354, or optionally another kind of identifying indicia, for identifying the tape cartridge magazine 306 which has utility should the tape cartridge magazine 306 be archived in a media pack storage vault, for example. In this embodiment, all tape cartridges 150 contain a MAM 154. In yet another embodiment, the tape cartridge magazine 306 can comprise a magazine MAM device 353 that can store at least the moniker and MAC data from the MAMs 154 associated with each of the tape cartridges 150 that are populated in the magazine 306. The magazine MAM device 353 can further be used with alternative mobile storage articles such as a disc drive, disc drive magazine 328, flash or other solid state memory, optical or magnetic disc, such as a CD or DVD, just to name a few.

Figure 4:
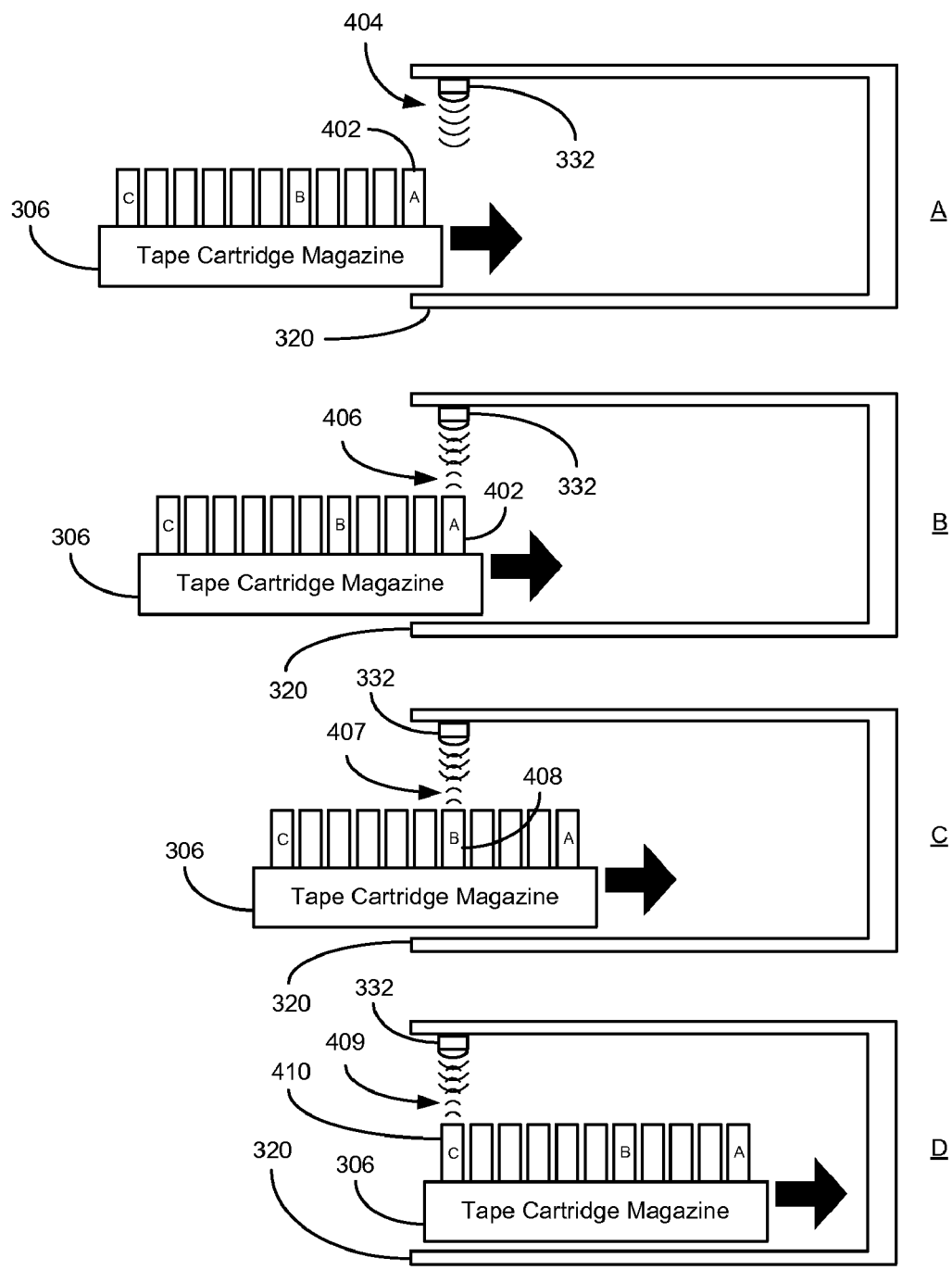
FIG. 4 is an illustration an embodiment of a shelf system that comprises a medium auxiliary memory reader that can be used in combination with a populated tape cartridge magazine in accordance with an embodiment of the present invention.

FIG. 4 illustrates an embodiment of a shelf system 320 that comprises an auxiliary memory reader 332 that can be used in combination with a loaded tape cartridge magazine 306. As illustratively shown in arrangement-A, the tape cartridge magazine 306 is in the process of being moved on to the shelf 320 in the direction of the arrow. The MAM reader 332 is shown transmitting an RF field 404 via device MAM 154 contained in cartridge A 402. Arrangement-B illustrates the MAM 154 contained in tape cartridge A 402 transmitting data, such as moniker and MAC information associated with encrypted data stored in cartridge A 402, in the form of an RF signal 406 to the MAM reader 332 when positioned in the presence of the RF field 404. In one embodiment, the MAM 154 is a passive device because it is energized when subjected to a strong enough RF field produced by the MAM reader 332. Information is transmitted between the MAM 154 and the MAM reader 332 via a specific radio frequency, shown here as 404 and 406. Data can be transferred and stored on MAM 154 from the library 300 or alternatively (and in addition to) data from the MAM 154 can be transferred to the auxiliary memory device 340 via the MAM reader 332. Arrangement-C illustrates the MAM 154 contained in tape cartridge B 408 transmitting data in the form of an RF signal 407 to the MAM reader 332 when positioned in the presence of the RF field 404. Arrangement-D illustrates the MAM 154 contained in tape cartridge C 410 transmitting data in the form of an RF signal 409 to the MAM reader 332 when positioned in the presence of the RF field 404. The moniker and MAC information relative to each tape cartridge 150 disposed in the magazine 306 can be further stored on a magazine MAM device 353, of FIG. 3B. In an optional embodiment, the MAM reader 332 (and all MAM readers for that matter) can be linked with a processor device, such as the interface 114 and the auxiliary memory device 340, thus, providing moniker and MAC information for comparison that can be used as an alternative to, or in addition to that which is stored on the MAM 154.

Figure 5:
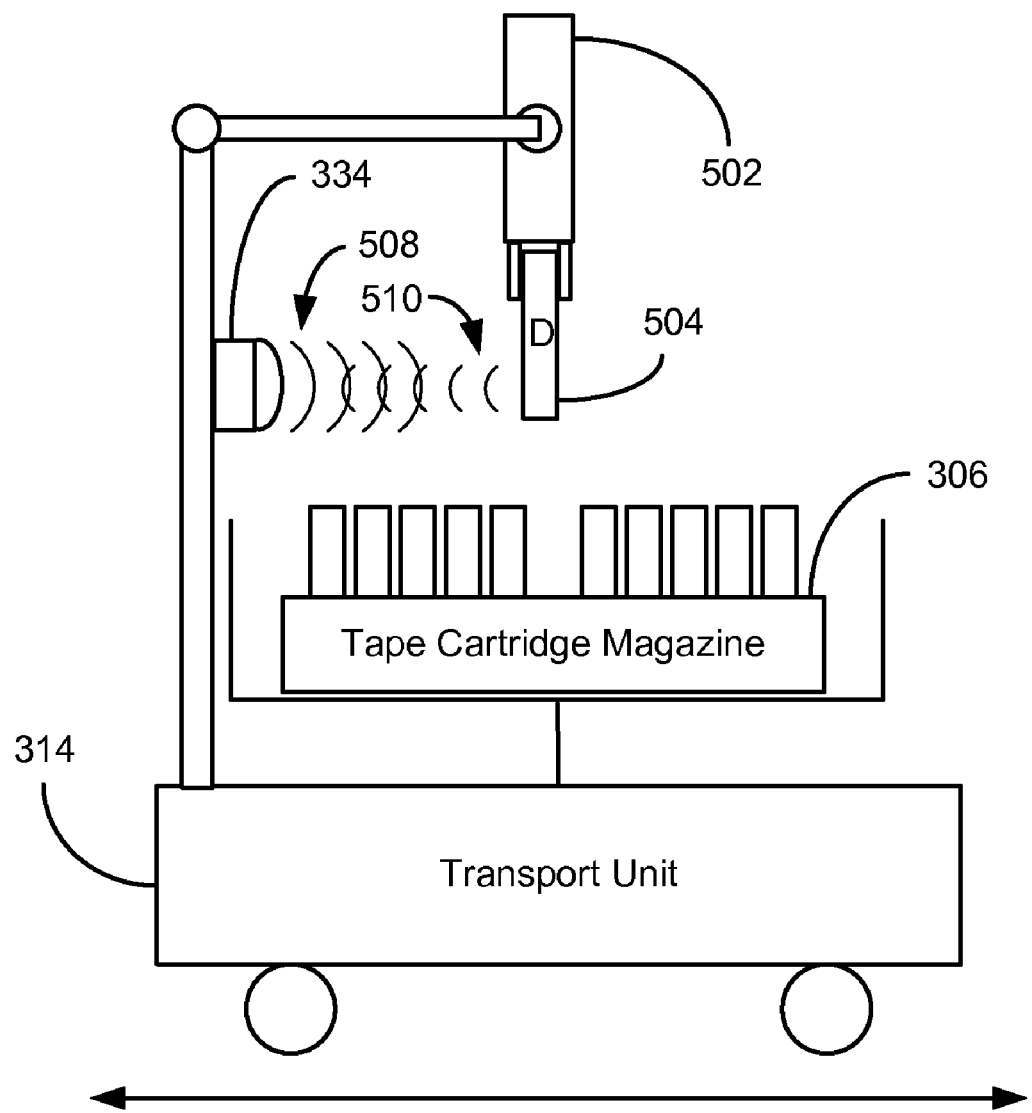
FIG. 5 is an illustration of a transport unit and medium auxiliary memory reader arrangement in accordance with an embodiment of the present invention.

With reference to FIG. 5, shown therein is an illustration of the transport unit 314, of FIG. 3A, in greater detail. The transport unit 314 is adapted to transport tape cartridge magazines 306 within the library 300. A cartridge picker 502, which can be associated with the transport unit 314, is adapted to move cartridges 150 from a tape cartridge magazine 306 into a cooperating read/write relationship with a tape drive, such as tape drive 322 of FIG. 3A. The transport unit 314 is illustratively shown herein accommodating an auxiliary memory reader 334 that is transmitting an RF field 508 (and potentially data) to a MAM 154 contained in tape cartridge D 504 whereby the MAM 154 of cartridge D 504 is transmitting data, such as moniker and MAC information, via an RF signal 510, to the auxiliary memory reader 334. In an optional embodiment, the MAM reader 334 can be linked with a processor device, such as the interface 114, and the auxiliary memory device 340, thus, providing moniker and MAC information that can be used as an alternative to the MAC reader and writer device 330 described in FIG. 3A.

Figure 6A:
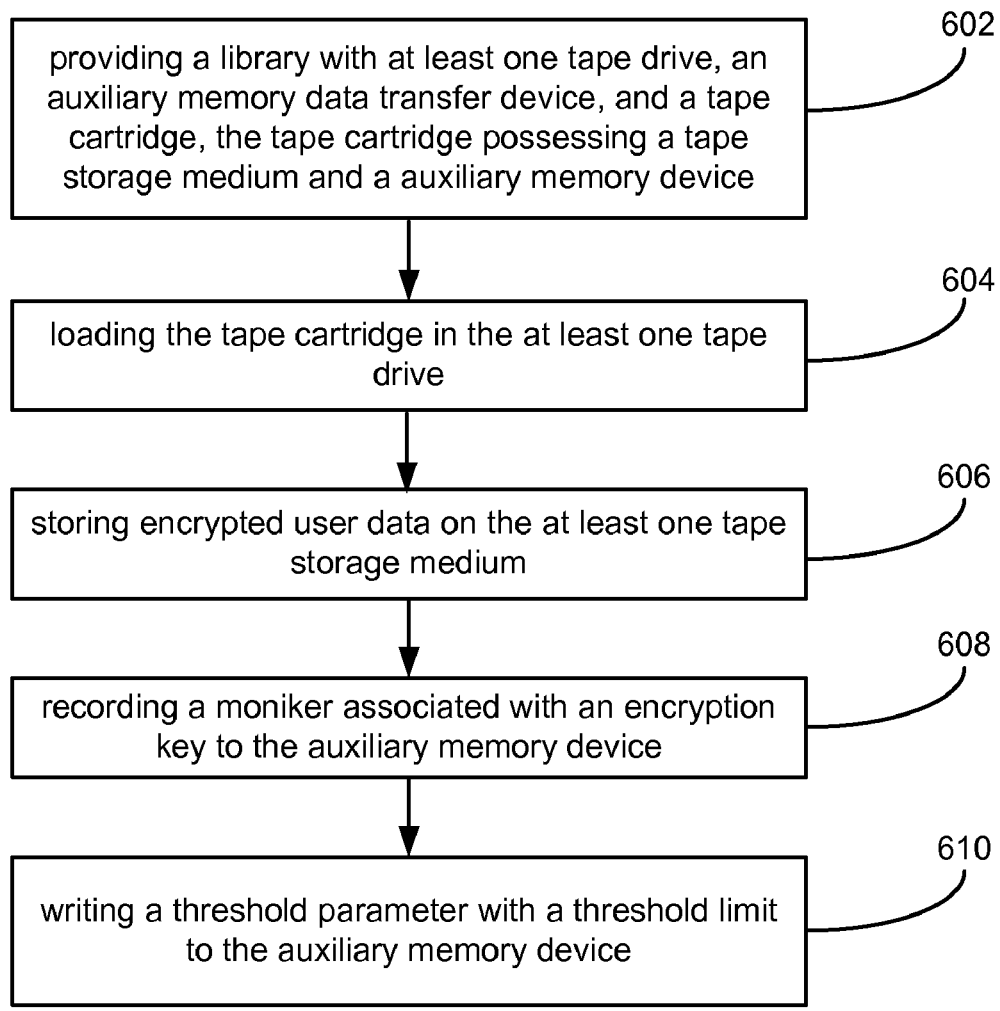
FIG. 6A is a block diagram illustrating a method to practice an embodiment of the present invention.

Referring now to FIG. 6A in conjunction with FIG. 3A, shown therein is a method to practice an embodiment of the present invention. It should be recognized that the steps presented in the described embodiments of the present invention do not necessarily require any particular sequence unless otherwise stated. As shown in step 602, a library 300 is provided with at least one tape drive 322, a MAM reader and writer device 330, and a tape cartridge 301, the tape cartridge 301 possessing a tape storage medium 152 and a MAM 154. As shown in step 604, the tape cartridge 301 is loaded in the at least one tape drive 322. As shown in step 606, encrypted user data is stored on the at least one tape storage medium 301. As shown in step 608, a moniker associated with an encryption key is recorded to the MAM 154 associated with the tape cartridge 301. As shown in step 610, a threshold parameter is written with a threshold limit to the MAM 154 associated with the tape cartridge 301.

Figure 6B:
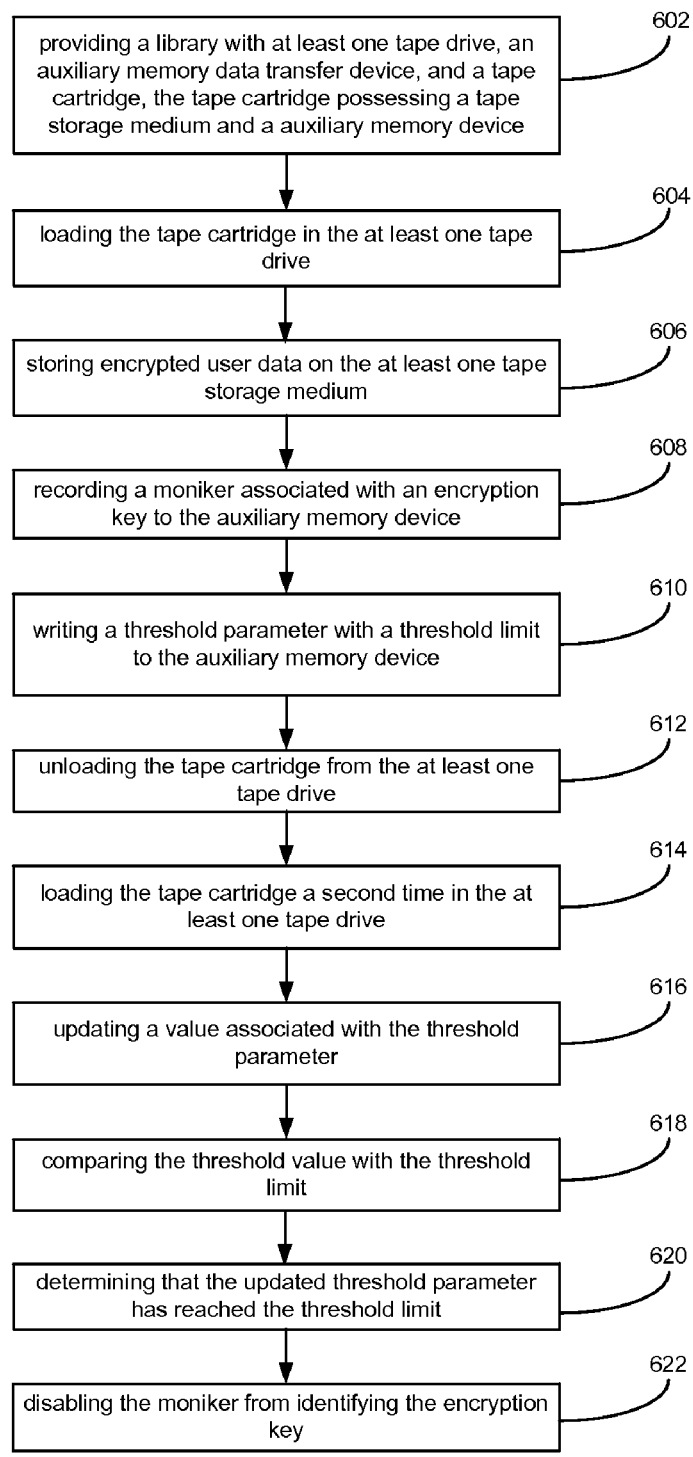
FIG. 6B is a block diagram illustrating an alternative method to practice an embodiment of the present invention.

FIG. 6B shows some alternative embodiments of the present invention which includes method steps 602, 604, 606, 608 and 610 from FIG. 6A. As shown in step 612, the tape cartridge 301 is unloaded from the at least one tape drive 322. As shown in step 614, the tape cartridge 301 is loaded a second time in the at least one tape drive 322. As shown in step 616, a value associated with the threshold parameter is updated, which can for example be load count incremented by one, time set to a new value, date value set to a new date, unauthorized location set, etc. As shown in step 618, the threshold value is compared with the threshold limit. As shown in step 620, the updated threshold parameter is determined to have reached the threshold limit. As shown in step 622, the moniker is disabled from identifying the encryption key. Optional embodiments can include steps for storing a threshold algorithm to MAM 154 wherein the threshold algorithm manages the threshold parameter and disables the moniker from identifying the encryption key when the threshold limit is reached. Yet other embodiments can include steps for writing at least one secondary threshold parameter with at least one secondary associated threshold limit to the auxiliary memory device wherein the at least on associated threshold limit and the at least one secondary threshold limit must both be reached prior to disabling the moniker from identifying the encryption key. In the event the threshold limit is not met, method steps can continue from step 616 as step for reading the moniker from the MAM via the MAM reader device 330, identifying the key from the moniker, and decrypting the user data.

Figure 7A:
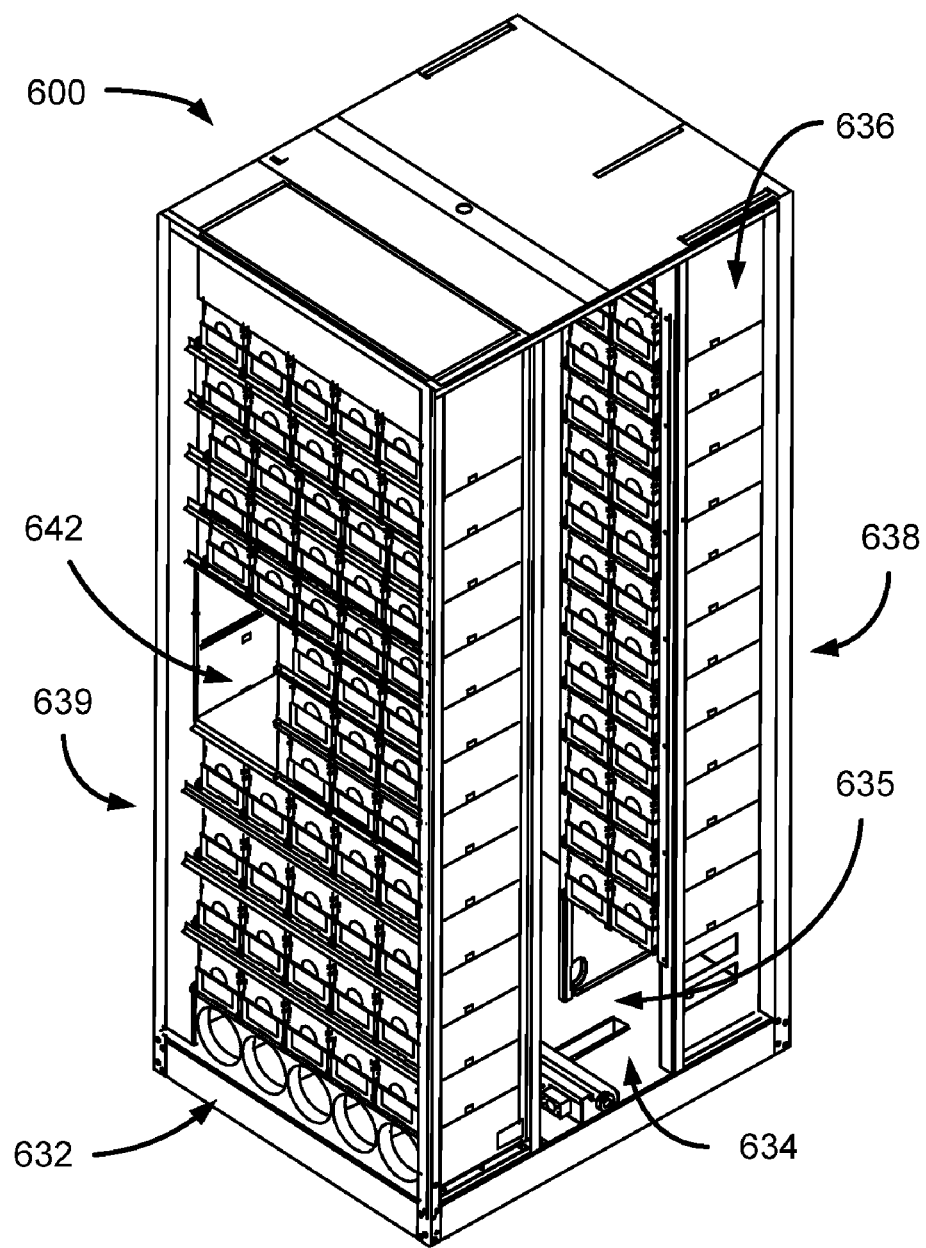
FIGS. 7A and 7B show different views of a Spectra Logic T950 storage library without a cover in which some embodiments of the present invention can be commercially practiced.

Embodiments of the present invention, shown in FIG. 7A, can be commercially practiced, for example, in connection with a Spectra Logic T950 data storage library 600 (shown herein without a cover), sold by Spectra Logic Corporation of Boulder, Colo. The T950 library 600 is capable of comprising both disc drive magazines 328, as shown in FIG. 3A, and tape cartridge magazines 306 populated with tape cartridges 150. A tape cartridge 150 and a disc drive magazine 328 are both embodiments of a mobile storage medium. Generally, the T950 library 600 comprises a first shelf system 630 that is adapted to support the tape cartridge magazines 306 and the disc drive magazines 328 which are archived by the library 600. In one configuration, the footprint of a tape cartridge magazine 306 and a disc drive magazine 328 are substantially identical for compatibility when archiving in the first shelf system 630 or moving the mobile media 306 and 328 within the library 600. The T950 library 600 further comprises a user definable space 636 capable of comprising additional shelf space 638 for mobile media 306 and 328 and/or space dedicated for drives, such as an LTO-3 tape drive(s) and/or disc drive magazine docking station(s) 702. Functionally interposed between the user definable space 636 and the first shelf system 630 is a magazine transport space 634. The magazine transport space 634 is adapted to provide adequate space for a magazine 306 and 328 to be moved from a position in the first shelf system 630, for example, to a drive, such as an LTO-3 tape drive. Magazines 306 and 328 can be transferred into and out from the T950 library 600 via an embodiment of an entry/exit port 642. Transferring magazines 306 and 328 in an out of the T950 library 600 can be accomplished by an operator for example. The T950 library 600 comprises a means for cooling as shown by the fans 632 located at the base of the library 600. The T950 library 600 further comprises an operator interface (such as a graphical user interface 226 of the type described in connection with, for example, FIG. 2B) located on the side surface 635 that is implemented with a touch screen (not shown).

Figure 7B:
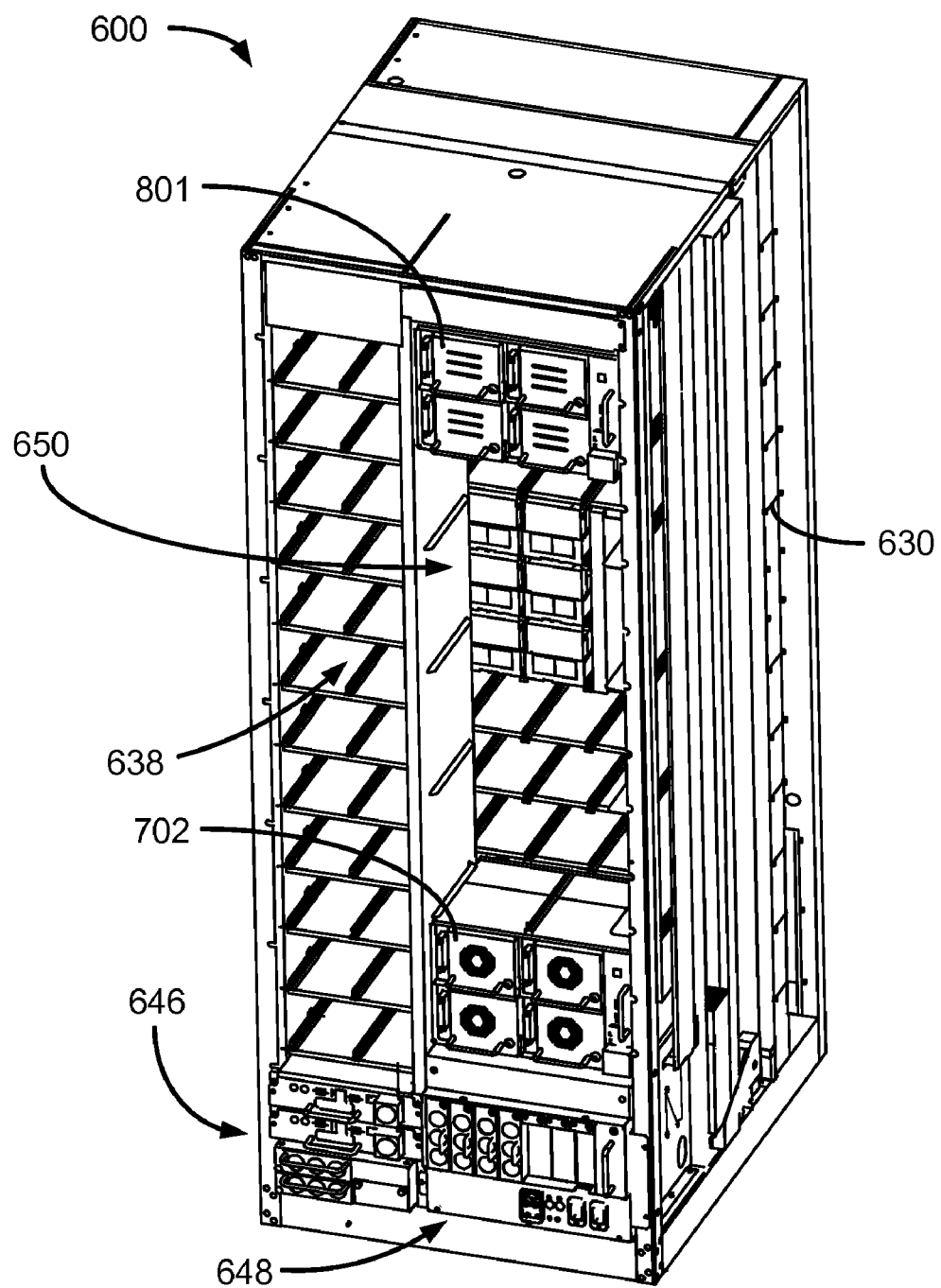

With reference to FIG. 7B, shown therein is the T950 library 600 without an enclosure, rotated 180° relative to FIG. 7A exposing the user definable space 636. The user definable space 636 shows a column of additional shelves 638 for archiving media 306 and 328, a block of four disc drive magazine docking stations 702 each comprising a magazine MAM device (not shown), a block of four LTO-3 tape drives 801, each comprising a MAM reader and writer device (not shown) and additional vacant user definable space 650. The T950 library 600 also comprises an embodiment of a controller bridge circuit 646, the Spectra Logic Fibre channel Quad Interface Processor (FQIP), and a power supply 648 capable of converting AC current to DC current for consumption by the library 600.

The T950 library 600 is capable of bridging communication between at least two different communications protocols on either side of the FQIP 646. The FQIP 646 functions as a combination bridge controller device enabling communication between the T950 library 600 and a client in a fibre channel protocol, for example, and communication from the FQIP 646 to a drive, such as one of the four docking stations 702, for example, in a SCSI channel protocol. Furthermore, the FQIP 646 is adapted to direct data for storage on a specific drive, such as the docking station 702, from a plurality of drives, such as the other seven tape drives and docking stations 806 and 702. Directing data traffic may be necessary should the T950 library 600 be divided into partitions wherein a first client may be allocated a first partition, or fraction, of the library's 600 storage capacity and resources (for example 60 percent of the storage space within the library 600) and a second client allocated the remainder of the library's 600 storage capacity and resources (for example 40 percent of the storage space within the library 600) in a second partition.

In accordance with aspects of the present invention, the FQIP 646 can be modified to include at least one encryption/decryption chip, such as the 7956 or 8155 class chip from Hifn Inc., of Los Gatos, Calif., for example. Each Hifn chip is adapted to encrypt and decrypt small packets of data (up to, for example, 32 K-byte data packets) because the Hifn chips are designed for network to network applications. Consequently, the FQIP 646, in one embodiment, generally comprises at least one CPU (Central Processing Unit), at least one volatile memory chip, a PCI bus, at least one Hifn chips, at least one fibre chips and at least one SCSI chips to accommodate the 32 K-byte data packets. Generally, data received are segmented in software into data packets no larger than 32K-bytes and sent to the Hifn chip for encryption and then reassembled with meta data for each 32K data packet and sent to the drive, via the SCSI chip as one (slightly larger than the original) tape write command. To elaborate for purposes of illustration, data is received from a client, such as in a steaming tape format, by a fibre chip which in turn sends to the memory chip in 64 K-byte packets. Once in volatile memory, the 64K-bytes of data are segmented in to 32 K-byte data packets and sent along with an Initialization Vector (IV), which introduces a random element to each data packet for additional security, and key to the Hifn chip for encryption. The encrypted 32K-byte data packets are then reassembled in the volatile memory along with the meta data, and sent to the mobile media via the SCSI chip. The moniker associated with the key can be randomly generated and MAC data unique to the user data and moniker are transmitted to the tape cartridge's MAM 154 via an RF MAM writer comprised by the LTO-3 drives. For decryption, the encrypted data is retrieved from the storage media and put into the volatile memory whereby the encrypted data packets along with the IV, key identified by the MAC and moniker from the MAM 154 are transmitted to the Hifn chip for decryption and then reassembled back to the original streamed form in the volatile memory for transmission to the client. As one skilled in the art will appreciate, data libraries routinely store several Gigabytes of data at a time. The FQIP 646 is linked via a CAN with a graphic user interface that is accessible by an operator using the library 600. The graphic user interface 612 is a medium though which an operator can input storage options such as number and size of partitions, moniker associated with the key (wherein the key, in one embodiment, can be internally uniquely generated), backup routines, etc. In an alternative embodiment, the MAC (used in conjunction with the moniker) is stored uniquely for each packet of data in a field in the meta data and just the moniker is sent to the MAM 154.

In one embodiment consistent with the present invention, a data package is received by a client over a fibre channel pathway to the FQIP 646 for storage in a partition of the library 600 allocated to the client. The data package is buffered then encrypted by a Hifn encryption chip comprised by the FQIP 646 in 32 K-byte packets and transmitted to a drive in cooperation with a mobile storage medium, such as the tape drive 801 and tape cassette 150, allocated to the client's partition. In addition to the encrypted data packets, a moniker associated with a decryption key capable of decrypting the data packets and a MAC capable of verifying proper decryption are transmitted for storage by the tape drive's MAM 154 via the FQIP 646. The MAC can be generated by the Hifn chip that encrypts the data. The moniker can be a nickname such as 'SALLY', for example, and can be used to quickly identify the associated decryption key which can be one from a set of a plurality of decryption keys. In this embodiment, the moniker is stored in plain text (i.e. non-encrypted data) in the MAM 154 and the decryption key is stored exclusively in the library 600. Upon creation of the key, a user, for example, can request a key associated with the moniker "SALLY" whereby a key can be randomly and uniquely generated for that moniker. "SALLY" cannot be used twice within the same library partition because every moniker will be associated with a uniquely generated key.

In one embodiment, the client need not be aware that their data is stored in an encrypted format. In this embodiment, management of an encryption key may be solely done by the library 600, for example.

Upon a requested to decrypt the data, such as by the client, the key comprising the decryption code is required to decrypt the data can be identified by use of the moniker stored in the MAM 154. Once the moniker is read, the T950 library 600 can provide the decryption key and enabling decryption of the user data. In some alternative embodiments, the key can exist with the client or with a third party, for example. The encryption key can be changed in desired increments of time such as every week, for example. The encryption key can be different for each client, data package received, etc.

The MAC is used as a means to verify that the data when decrypted is identical to the data that was originally received from the client prior to encryption. In the event the decrypted data has been corrupted or changed from when the data was originally received by the client, an error will be sent to the client that the data has not been successfully decrypted, or in the case where a client is unaware of encrypted data, a retrieval error will be sent.

In one embodiment, a moniker is not needed; rather the verification from the HMAC that the data has been successfully decrypted can be used. In this option, the set of keys used for encryption can be tried in succession, for example, until the data has been verified as decrypted. The HMAC can be stored in the MAM 154 of the tape cartridge retaining the encrypted user data.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple monikers can be used with multiple keys for one set of data to increase complexity in security, for example, while still maintaining substantially the same functionality without departing from the scope and spirit of the present invention. Another example can include using these techniques in addition to using multiple threshold parameters stored on a MAM 154, to name a few examples while still maintaining substantially the same functionality without departing from the scope and spirit of the present invention. Further, though communication is described herein as between a client 102 and the library, such as the library 100, communication can be received by the drive, such as the first drive 104, via the combination bridge controller device 114, for example, without departing from the scope and spirit of the present invention. Further, for purposes of illustration, a first and second drive and tape cartridges are used herein to simplify the description for a plurality of drives and tape cartridges. Finally, although the preferred embodiments described herein are directed to disc drive systems, such as the tape cartridges 150, and tape storage systems, such as a tape library and tape drives, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A tape cartridge comprising:
   tape storage medium;
   encrypted data stored on said tape storage medium wherein said encrypted data can be unencrypted via an encryption key by a macro processor of a computing device, said encryption key is maintained in a location elsewhere from said tape cartridge;
a medium auxiliary memory possessing a moniker that is used to identify said encryption key;
a threshold parameter stored in said medium auxiliary memory wherein said threshold parameter influences a moniker state control, said moniker state control comprises an on state and an off state wherein said off state disables said moniker from identifying said encryption key.

2. The tape cartridge of claim 1 wherein said off state is irreversible.

3. The tape cartridge of claim 1 wherein said threshold parameter and moniker state control are stored in said medium auxiliary memory by a medium auxiliary memory writer associated with a library, said library is adapted to accommodate said tape cartridge.

4. The tape cartridge of claim 1 wherein said threshold parameter consists essentially of a time limit that when said time limit expires said moniker state control is switched from said on state to said off state.

5. The tape cartridge of claim 1 wherein said threshold parameter consists essentially of an unauthorized location that when said tape cartridge is moved to said unauthorized location, said moniker state control is switched from said on state to said off state.

6. The tape cartridge of claim 1 wherein said threshold parameter consists essentially of a quantity of loads with at least one tape drive that when said tape cartridge reaches said quantity of loads, said moniker state control is switched from said on state to said off state.

7. The tape cartridge of claim 1 wherein said threshold parameter consists essentially of a quantity of incorrect access attempts that when said tape cartridge reaches said quantity of access attempts, said moniker state control is switched from said on state to said off state.

8. The tape cartridge of claim 1 wherein said threshold parameter consists essentially of a quantity of different libraries used to access said tape cartridge wherein when said quantity of different libraries is reached, said moniker state control is switched from said on state to said off state.

9. A tape storage library comprising:
a tape drive;
an auxiliary memory data transfer device; and
a tape cartridge comprising a tape medium that possesses encrypted data wherein said encrypted data can be unencrypted by a macro processor of a computing device via an encryption key, said tape cartridge further comprising an auxiliary memory device that possesses a moniker and a threshold parameter wherein said moniker identifies said encryption key that is maintained in a location other than said tape cartridge and wherein said threshold parameter influences a means for disabling said moniker from identifying said encryption key.

10. The tape storage library of claim 9 wherein said threshold parameter is compared to a threshold parameter input such that when said input reaches a limit associated with said threshold parameter said moniker is disabled.

11. The tape cartridge of claim 10 wherein said threshold parameter input is updated at least every time said tape cartridge is loaded into said tape drive.

12. The tape cartridge of claim 10 wherein said means for disabling said moniker is accomplished by an algorithm associated with said library wherein said algorithm receives said input and has knowledge of said limit.

13. The tape cartridge of claim 10 wherein said threshold parameter is time and said threshold parameter limit is a time limit.

14. The tape cartridge of claim 9 wherein said auxiliary memory device further comprises a routine that is activated by said auxiliary memory data transfer device wherein said means for disabling said moniker is accomplished by said routine.

15. The tape cartridge of claim 9 wherein said auxiliary memory data transfer device detects when said tape cartridge is displaced in an unauthorized location relative to said tape storage library and causes said means for disabling said moniker to disable said moniker.

16. A method comprising:
providing a library with at least one tape drive, an auxiliary memory data transfer device, and a tape cartridge, said tape cartridge possessing a tape storage medium and a auxiliary memory device;
loading said tape cartridge in said at least one tape drive;
storing encrypted user data on said tape storage medium;
recording a moniker associated with an encryption key to said auxiliary memory device;
writing a threshold parameter stored in said auxiliary memory device wherein said threshold parameter influences a moniker state control, said moniker state control comprises an on state and an off state wherein said off state disables said moniker from identifying said encryption key.

17. The method of claim 16 further comprising:
unloading said tape cartridge from said at least one tape drive;
loading said tape cartridge a second time in said at least one tape drive;
updating a value associated with said threshold parameter.

18. The method of claim 17 further comprising:
reading said moniker from said auxiliary memory device via said auxiliary memory data transfer device;
identifying said key from said moniker;
decrypting said user data.

19. The method of claim 17 further comprising:
comparing said threshold value with the threshold limit;
determining that said updated threshold parameter has reached said threshold limit;
disabling said moniker from identifying said encryption key.

20. The method of claim 16 further comprising storing a threshold algorithm to said auxiliary memory device wherein said threshold algorithm manages said threshold parameter and disables said moniker from identifying said encryption key when said threshold limit is reached.

21. The method of claim 16 further comprising writing at least one secondary threshold parameter with at least one secondary associated threshold limit to said auxiliary memory device wherein said at least on associated threshold limit and said at least one secondary threshold limit must both be reached prior to disabling said moniker from identifying said encryption key.

* * * * *